United States Patent [19]

Maruyama et al.

[11] Patent Number: 4,941,002

[45] Date of Patent: Jul. 10, 1990

[54] PAGE PRINTER

[75] Inventors: Mitsuaki Maruyama; Hiroshi Niki; Shigeru Sawada; Seiji Mochizuki; Yasuhiro Gyoutoku, all of Nagano, Japan

[73] Assignee: Seiko Epson Corporation, Tokyo, Japan

[21] Appl. No.: 397,903

[22] Filed: Aug. 24, 1989

[30] Foreign Application Priority Data

| | | | |
|---|---|---|---|
| Aug. 31, 1988 | [JP] | Japan | 63-218038 |
| Aug. 31, 1988 | [JP] | Japan | 63-218039 |
| Aug. 31, 1988 | [JP] | Japan | 63-218040 |

[51] Int. Cl.[5] ............ G01D 15/00

[52] U.S. Cl. ............ 346/160

[58] Field of Search ............ 346/160, 160.1; 355/203, 210, 211, 219, 220, 245, 271, 321

[56] References Cited

U.S. PATENT DOCUMENTS

| | | | |
|---|---|---|---|
| 4,618,137 | 10/1986 | Boeve et al. | 271/219 |
| 4,664,504 | 4/1987 | Oda et al. | 355/15 |
| 4,752,801 | 6/1988 | Kando | 355/3 R |
| 4,754,293 | 6/1988 | Aizawa et al. | 346/160 |
| 4,785,319 | 11/1988 | Fujino et al. | 346/160 |

*Primary Examiner*—Donald A. Griffin

*Attorney, Agent, or Firm*—Cushman, Darby & Cushman

[57] ABSTRACT

In a page printer, a gate roller, a developing unit, a photo-sensitive drum unit, a fixing unit and a sheet discharging roller are mounted on the open front side of a housing body in the order stated from above, thus forming a substantially vertical sheet conveying path. As a result, the installation floor area is reduced. In the rear portion of the housing, and a transferring unit and a sheet guide member are provided on the cover of the housing body. Thus, the light beam generating unit and the photo-sensitive drum are maintained unchanged in position at all times. A cut sheet feeder is mounted over the housing body so that it is movable back and forth, thus facilitating the inspection and maintenance of the printer.

8 Claims, 10 Drawing Sheets

PAGE PRINTER

BACKGROUND OF THE INVENTION

1. Field of the Invention

This invention relates to a page printer in which a light beam controlled with a data signal is applied to a photo-sensitive material to record characters, patterns, etc. on a sheet in accordance with the principle of electrophotography.

2. Description of the Related Art

A page printer based on the principle of "xerography" has been developed. In that page printer, a light beam controlled with printing data is applied to a photo-sensitive material to form a latent image thereon. The latent image is developed with coloring toner and fixed on a printing sheet.

A page printer of the type described above is shown in FIG. 13 and includes a horizontal housing M made up of two members N and Q so that the member Q is swung upwardly to open the housing. An optical writing unit is built in the member Q, while a photo-sensitive drum, a developing unit, etc. are in the member N. A sheet conveying path is provided from one side of the housing to the other side, so as to supply a printing sheet from a sheet cassette R provided on the one side of the housing. Thus, the illustrated page printer is of the "clamshell" type.

The above-described page printer has a number of deficiencies. For example, since the light beam generating unit and the photo-sensitive drum are positioned relative to one another by means of a hinge mechanism S of the housing M, the positioning of the light beam generating unit and the photo-sensitive drum may be inaccurate. In addition, in order to provide a sheet storage section and a printing route section, the device occupies a floor area at least two times the area of a printing sheet.

In order to overcome the above-described drawbacks, the present applicant proposed a page printer in Japanese Patent Application (UPA) No. 234167/1987 (the term "UPA" as used herein means an "Unexamined Published Application"). In that page printer, the sheet conveying path is substantially vertical, and the light beam generating unit and the photo-sensitive drum are provided on the base side. The page printer thus proposed is advantageous in that the floor area required for installation is decreased, and the positioning of the light beam generating unit and the photo-sensitive drum is more accurate. However, it is still disadvantageous in that the maintenance of the unit, which is located deep in the housing body, requires labor and takes time.

In addition, since the sheet conveying path is substantially vertical, while the printing sheet is being moved from the transferring unit to the fixing unit, it may not remain in a proper orientation and its toner surface, which is not yet fixed, may be scratched by parts of the printer.

SUMMARY OF THE INVENTION

In view of the foregoing, an object of this invention is to provide a page printer in which the floor area required for installation is decreased, the light beam generating unit and the photo-sensitive drum can be accurately positioned, and the resultant print is excellent in quality.

Another object of the invention is to provide a cut sheet supplying device in which the floor area required for installation can be decreased, any maintenance work can be achieved with ease, and manual insertion of a printing sheet can be readily performed.

The foregoing objects and other objects of the invention are achieved by providing a page printer which comprises: a housing including a housing body have an open upper end and an open front end and a cover pivotally coupled to the lower end portion of the housing body; a gate roller, a developing unit, a photo-sensitive drum unit, a fixing unit, and a sheet discharging roller arranged on the front side of the housing body, in the stated order from above; an optical writing unit provided on the rear side of the housing body; a transferring unit and a sheet guide member which are provided on the cover so that the transferring unit and sheet guide member are confronted with the photo-sensitive drum unit when the cover is closed; and a cut sheet feeder provided above the open upper end of the housing body so that the cut sheet feeder is movable relative to the housing body.

In the page printer of the invention, the printing sheet conveying path is formed substantially vertically, and a guide member is provided between the photo-sensitive drum unit and the fixing unit to guide the printing sheet so that the toner surface thereof curves inwardly.

Furthermore, in the page printer of the invention, a sheet feeding device is provided which comprises: a frame which is mounted to the housing body with guide means so that the frame is horizontally movable between a sheet feed position and retract position; a sheet feed roller mounted in parallel with the front side of the housing; a sheet hopper for elastically pushing the lower end portion of a printing sheet against the sheet feed roller; and a guide member extended from below the sheet feed roller to the sheet receiving inlet.

In the page printer according to the invention, the developing unit, the photo-sensitive drum unit, the fixing unit and the sheet discharging roller are arranged on the front side of the housing body in the stated order from above, as was described above. Therefore, the printing sheet conveying path is substantially vertical, which helps reduce the floor area required for installation. Furthermore, the units concerning the printing sheet are provided in the open front end of the housing body, while the members handling the printing sheet in cooperation with these units are provided on the cover. Therefore, the printing sheet conveying path can be readily exposed by opening the cover, and the photo-sensitive drum and the optical writing unit, which should be positioned with high precision, are never changed in the position.

In accordance with the invention, the printing sheet passed through the photo-sensitive drum unit is conveyed as follows: First, the front end of the printing sheet is brought into contact with a guide member. As the printed region of the sheet increases, the sheet is moved on with its rear side along the guide member. Thus, the printing sheet enters the fixing unit while being maintained curved. Accordingly, the toner surface of the printing sheet is maintained spaced a certain distance from the mechanism in the printer body until the printing sheet reaches the fixing unit. As a result, the toner surface will not be damaged by the mechanisms in the printer body.

Furthermore, in the page printer of the invention, the upper end portion of the printer body can be exposed merely by moving the cut sheet feeder backwardly.

Therefore, the inside of the printer body can be readily inspected. This movement, does not change the disposition of the sheet hopper.

Other objects, features, and characteristics of the present invention, as well as the methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE INVENTION

Preferred embodiments of this invention will be described with reference to the accompanying drawings.

Figure 1:
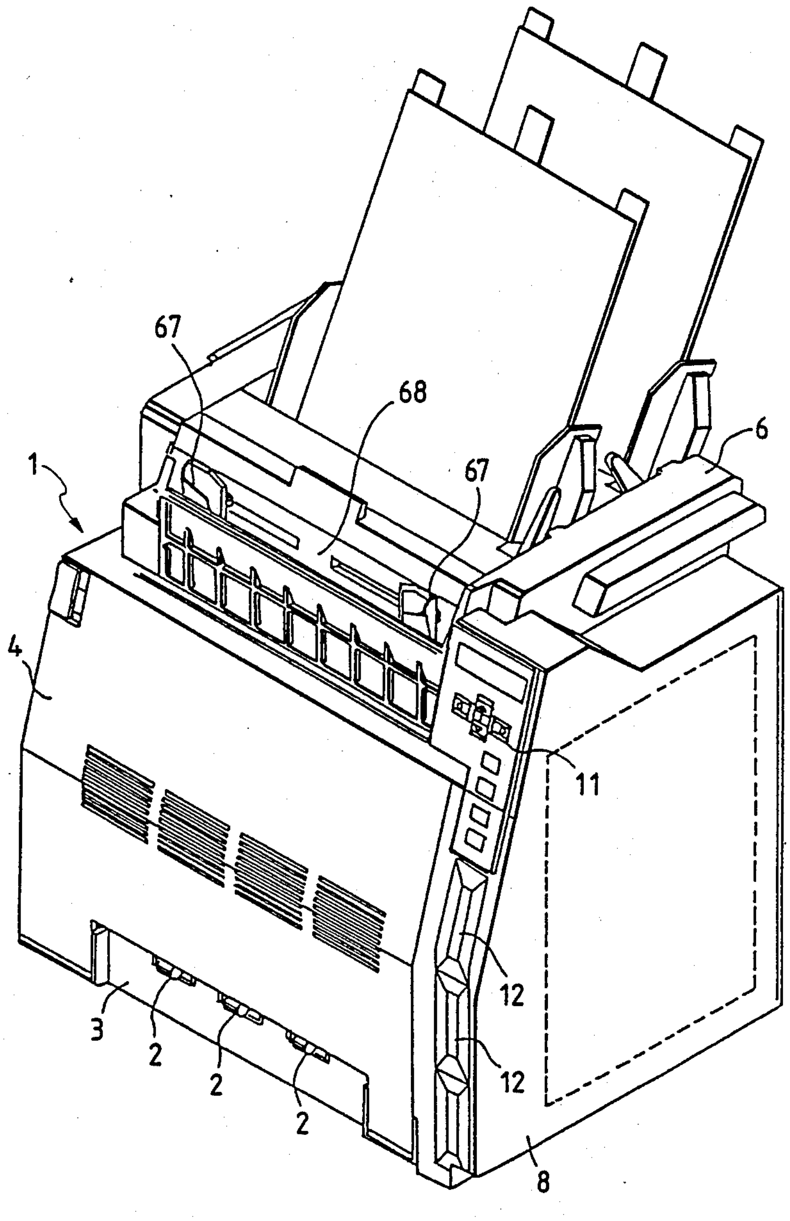
FIG. 1 is a perspective view showing one example of a page printer with a cut sheet feeder according to this invention.

FIGS. 1, 2, 3, and 4 are perspective views and showing one example of a page printer according to the invention. In these figures, reference numeral 1 designates a housing body accommodating a printing mechanism. A sheet discharging outlet 3 for discharging a printing sheet conveyed by sheet discharging rollers 2 is formed in the lower portion of the front side of the housing body 1. A cover 4 is hinged on the housing 1 so that it lies across the sheet discharging outlet. Side boards 5 supporting various units are provided inside the housing on both sides. A cut sheet feeder 6 is provided above the housing so that it is movable by means of guide mechanisms 7. A compartment 9 is provided on one side of the housing body 1, on the right of the right side board 5 in FIG. 2. The compartment 9 is closed with a cover B (FIG. 1). A control circuit board 11 and an external memory medium inserting inlets 12 are provided on the front side of the compartment 9.

A sheet guide board 15 communicated with a sheet receiving member 14 which opens upwardly is provided on the front side of the housing body 1. In addition, gate rollers 17 are provided, a photo-sensitive drum unit 18 (FIG. 2) is arranged below the gate rollers 17, and a fixing unit 44 is disposed through a partition board 43, described below, beneath the photo-sensitive drum unit 18.

Figure 6:
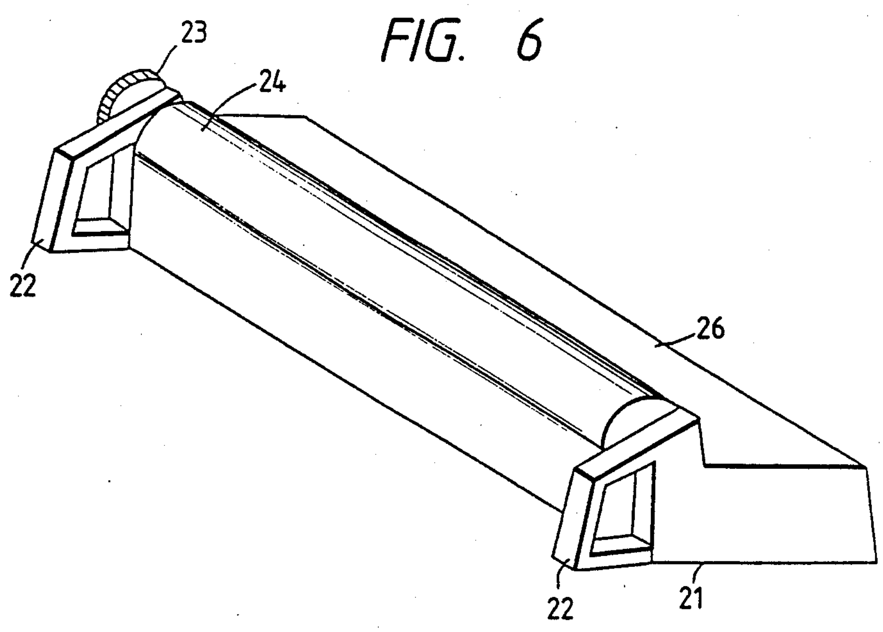
FIG. 6 is a perspective view showing one example of a photo-sensitive drum magazine.
Figure 7:
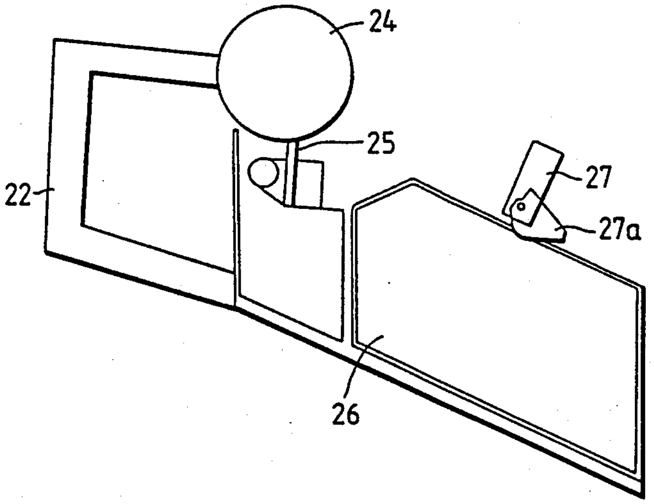
FIG. 7 is a sectional view showing one example of a photo-sensitive drum magazine.

FIGS. 6 and 7 show one example of the photo-sensitive drum unit 18. The photo-sensitive drum unit 18 has a base 21 on each side thereof, which have handles 22 on the front ends thereof which are guided by the side boards 5 of the housing body 1. A photo-sensitive drum 24 is rotatably mounted on the bases 2; and has a gear on the like 23 mounted to one end thereof for engaging a drive mechanism (not shown). A blade 25 and a waste toner tank 26 for receiving toner from the blade 25 are provided below the photo-sensitive drum 24. The blade 25 is brought into contact with the surface of the photo-sensitive drum. The drum 24, the blade 25, and the tank 26 form one unit. Further in FIGS. 6 and 7, reference numeral 27 designates a waste toner detector with a detecting lever 27*a* which is raised when the tank 26 is filled with waste toner.

Figure 5:
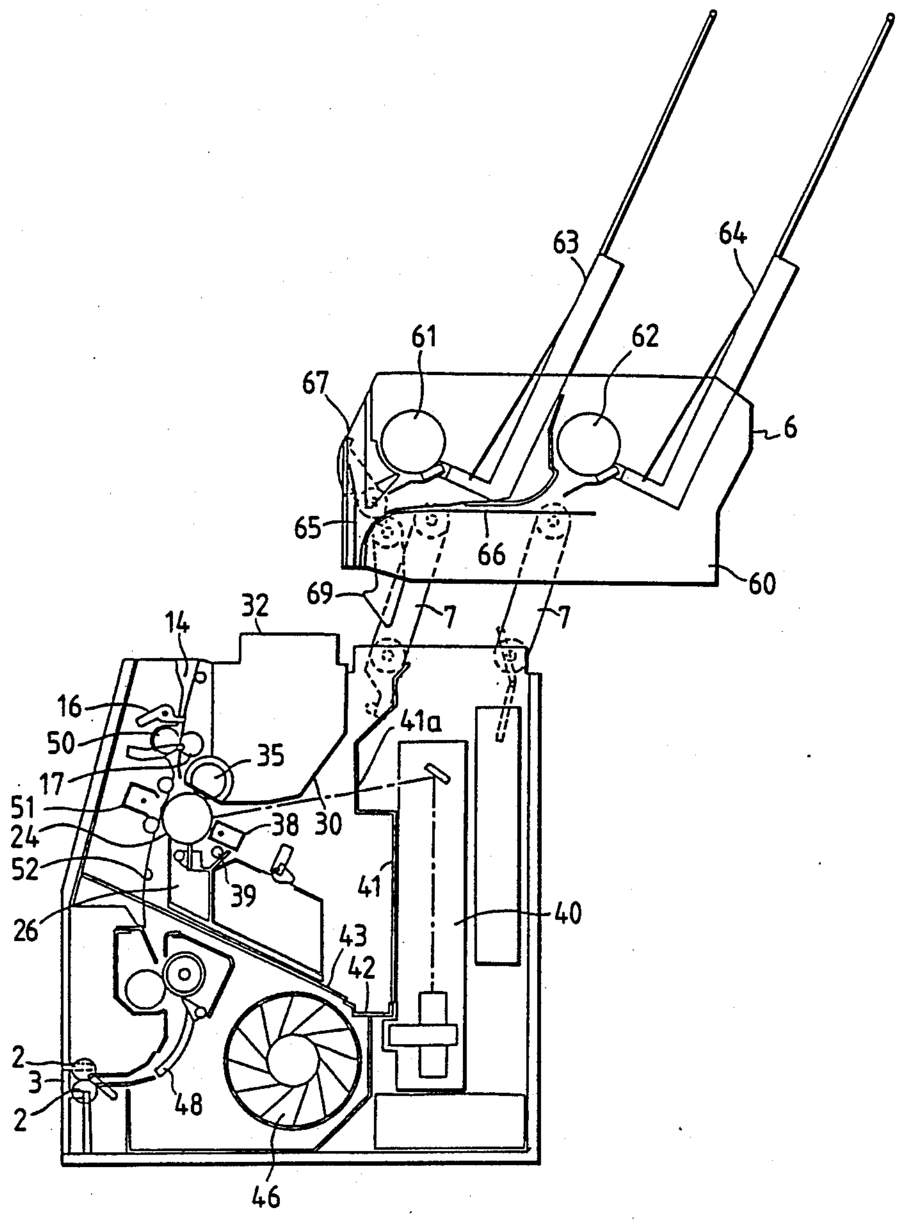
FIG. 5 is a sectional view showing the page printer with the cut sheet feeder retracted.

Referring back to FIGS. 1 through 4, a developing unit 30 is provided behind the sheet guide board 15 so that, when the cut sheet feeder is retracted (as shown in FIG. 5), a cover member 32 is exposed.

Figure 8:
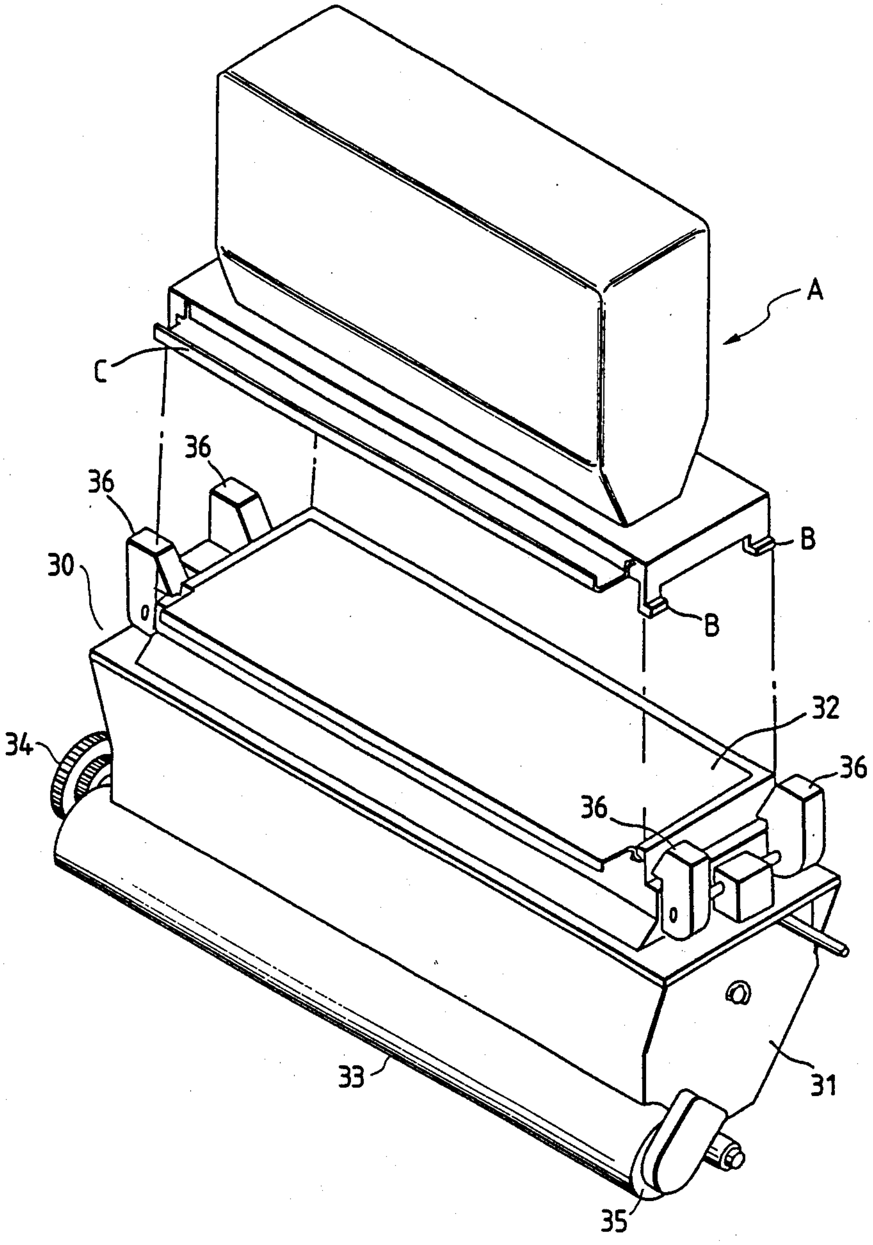
FIG. 8 is a perspective view showing a developing unit and a toner cartridge in the page printer according to the invention.

FIG. 8 shows one example of the above-described developing unit. In FIG. 8, reference numeral 31 designates a hopper type toner container which as a toner supplying inlet opened upwardly, and an opening 33 opened downwardly. The toner supplying inlet is opened and closed with the cover 32 which is horizontally slidable. A magnetic sleeve 35 is provided below the toner container 31. The magnetic sleeve 35 is turned by a gear 34 which is engaged with a drive gear in the body, to sealing close the lower opening 33. Pawl members 36 are provided on the upper surface of the container 31 so that they are engageable with the engaging parts B of a toner supplying cartridge A. Further in FIG. 8, reference character C designates a shutter member which is slidably mounted on the lower portion of the cartridge A.

Referring back to FIGS. 1 through 4, the magnetic brush provided on the surface of the magnetic sleeve 35 of the developing unit 30 is in contact with the photo-sensitive drum 24. A charging unit 38 is provided for the photo-sensitive drum 24 so that it is spaced from the bottom 31*a* of the container 31 of the developing unit 30 circumferentially of the drum as required. And a discharging unit 39 is disposed around the drum so that it is spaced from the charging unit 38 in the direction of rotation of the drum.

Further in these figures, reference numeral 40 designates an optical writing unit which is optically shielded by a partition wall 41 on the front and rear sides; that is, the unit is provided in the rear space defined by the partition wall 41. The output light beam of the optical writing unit 40 is applied through a window 41*a* formed in the partition wall 41 and through the gap between the developing unit 30 and the charging unit 38 to the surface of the photo-sensitive drum 24.

A shield board 43 is provided below the photo-sensitive drum unit 18, in such a manner that it is slanted backwardly and is integral with the rear partition wall 41, and it divides the space in the housing body into two spaces, namely, the upper and lower spaces. The fixing unit 44 comprises a heating roller 45, a pressurizing roller 47, and an exhaust fan 46 are built in the lower space. The heating roller 45 and the pressurizing roller 47 are so positioned that the straight line connecting the central axes of these rollers 45 and 47 is substantially perpendicular to the front end of the sheet which is moved along a guide member 48. The guide member 48 is provided on the sheet discharge side of the fixing unit 44, so that the printing sheet moved vertically is delivered to the sheet discharging outlet 3 through the sheet discharging rollers 2. A groove 42 for receiving waste toner is provided at the joint of the board 43 and the wall 41.

Figure 2:
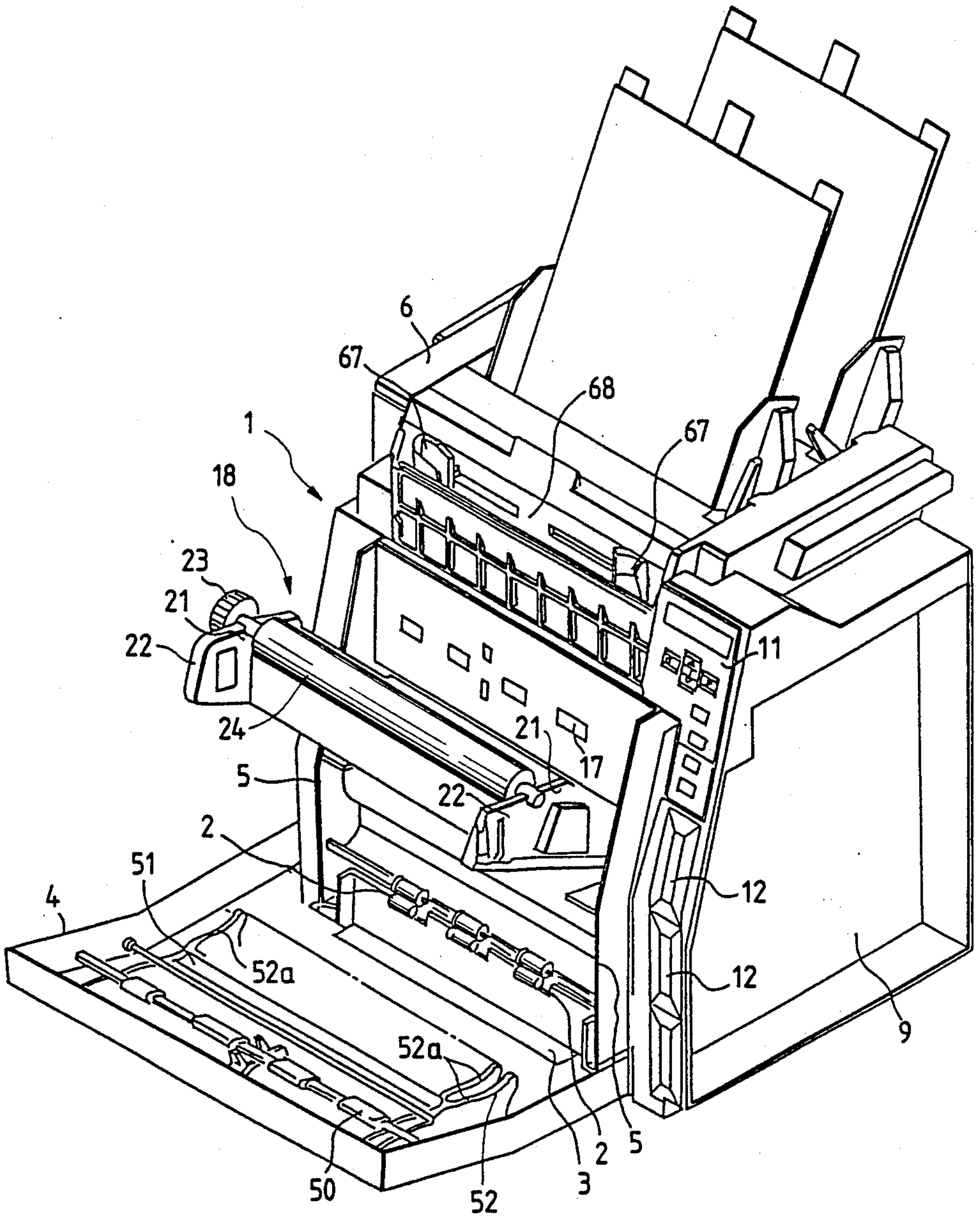
FIG. 2 is a perspective view showing the page printer with its cover opened and with a drum cassette removed.
Figure 3:
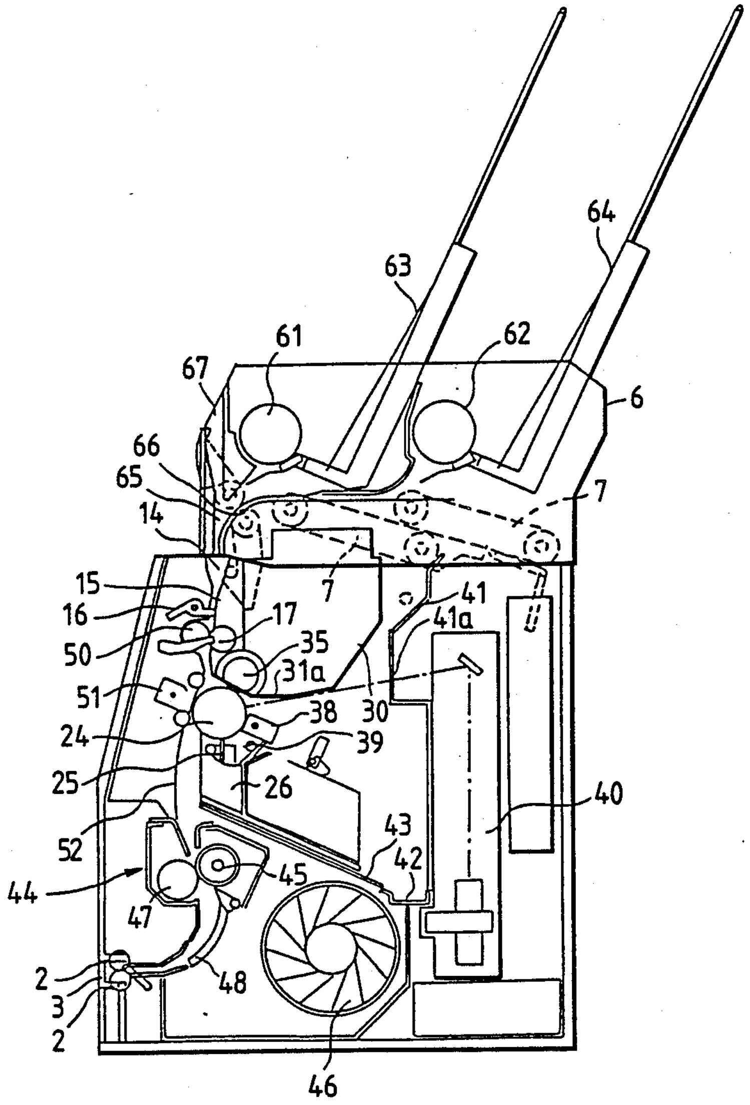
FIG. 3 is a sectional view showing the page printer ready a printing operation.
Figure 4:
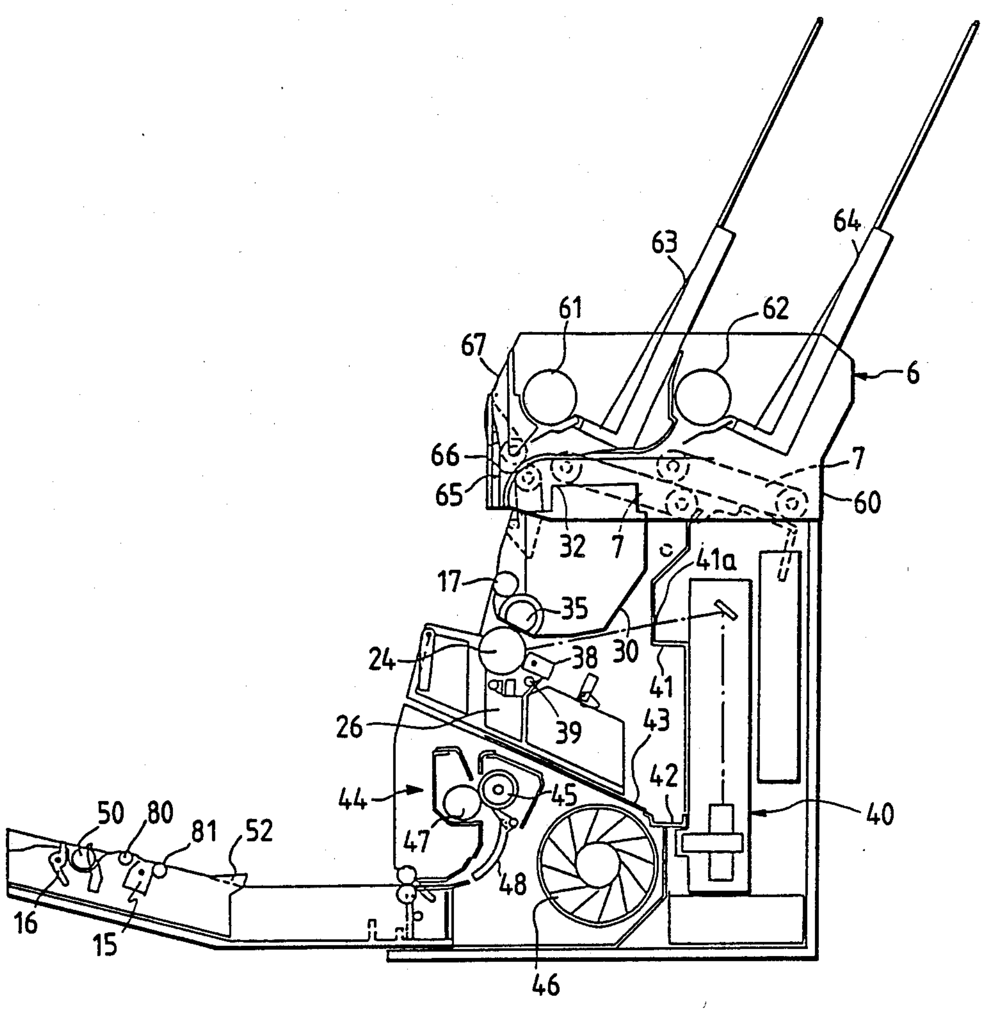
FIG. 4 is a sectional view showing the page printer with the cover opened.
Figure 9:
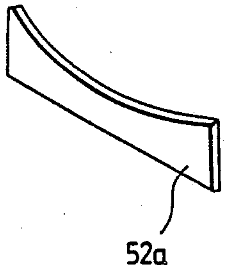
FIG. 9 is a perspective view showing one example of a rib forming a guide member in the page printer.

A sheet detecting lever 16 for operating a sheet detector (not shown), pinch rollers 50, and a transferring unit 51 are provided on the inner surface of the cover 4 in the order stated, from above, so that the pinch rollers 50 are abutted against the gate rollers 17, and the transferring unit 51 confronts with the photo-sensitive drum 24 downstream of the magnetic sleeve 35. Rollers 80, 81 are provided on both sides of the transferring unit 51, so that the sheet coming to the photo-sensitive drum 24 is forwarded substantially along the tangent line of the photo-sensitive drum to a guide member 52. The guide member 52 comprises a plurality of ribs 52*a*, each of which is concave at the center, which are arranged in the direction of width of the printing sheet (FIG. 2 and FIG. 9). The guide member 52 is disposed in a sheet conveying path from the photo-sensitive drum 24 to the fixing unit 44, so that the printing sheet is curved toward the cover 4; i.e., its toner surface is curved inwardly when forwarded from the photo-sensitive drum 24.

The cut sheet feeder 6 is provided above the housing body 1 by means of link mechanisms 7 and has a frame 60 which can be set at two positions, namely, a sheet feed position (FIG. 3) and a retract position (FIG. 5). A front sheet feed roller 61 and a rear sheet feed roller 62 are mounted on the frame 60 in such a manner that they are in parallel with each other. Sheet hopper 63 and 64 are held substantially vertical so as to cause the lower end portion of a printing sheet to elastically abut against the sheet feed rollers 61 and 62. Guide members 65 and 66 are extended below the sheet feed rollers 61 and 62 to a sheet receiving inlet 14 on the body side. Guide members 67 (FIG. 1) are provided substantially above the sheet receiving inlet 14 and at the front end portion of the frame 60 so as to form a manual sheet inserting inlet 68. A lock member 69 (FIG. 5) is also provided for securing the frame 60 to the housing body 1.

With the foregoing structure, once the size of a printing sheet is selected, then one of the sheet feed rollers 61 and 62, for example roller 62, is turned to take one printing sheet from the sheet hopper 64. The sheet thus taken is delivered to the body 1 by the guide 66. Upon arrival at the upper surface of the housing body 1, the sheet goes into the sheet receiving inlet 14 which is opened upwardly. Then the sheet, being guided by the guide board 15, is moved downwardly in the housing body 1 to abut against the gate rollers 17. During that downward motion, the sheet pushes detecting lever 16. As a result, the sheet detector outputs a detection signal, so that the gate rollers 17 are turned to convey the sheet downwardly with a sheet reference position determined.

Data to be printed is applied to the control circuit board to control the light beam generating unit 40, so that a latent image is formed on the photo-sensitive drum 24 in accordance with the data. The latent image is developed with toner applied thereto by the developing sleeve 35 as the photo-sensitive drum 24 turns. As the photosensitive drum 24 is turned, the developed image is moved to confront with the transferring unit 51, where it is transferred onto the printing sheet.

Figures 10A, 10B, 10C:
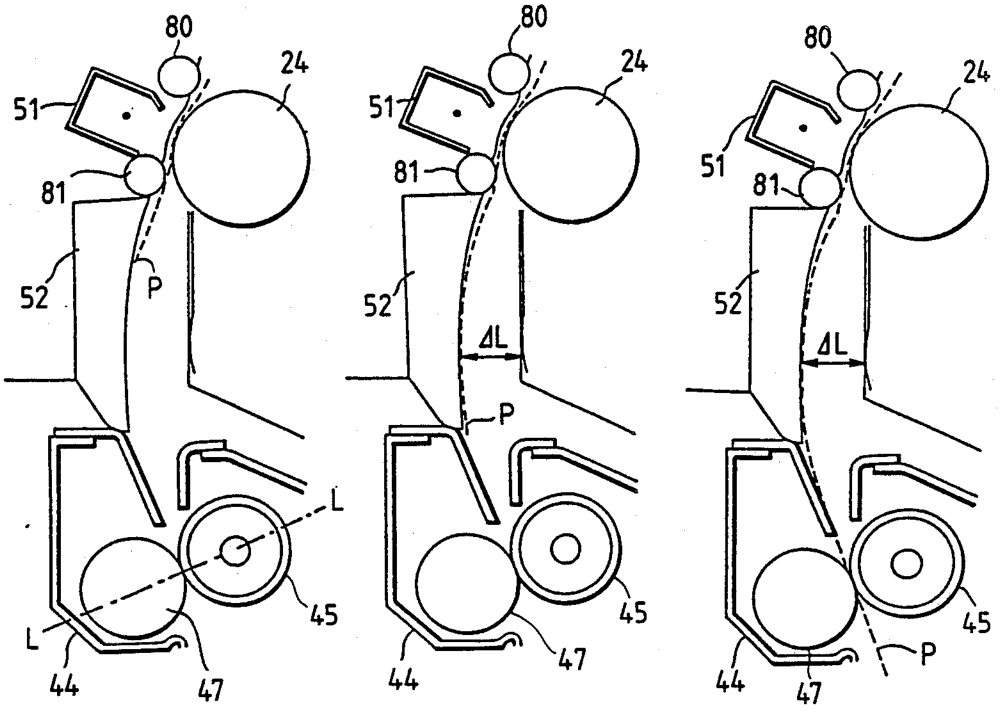
FIGS. 10A, 10B and 10C are explanatory diagrams for describing the conveyance of a printing sheet from the photo-sensitive drum unit to the fixing unit.

The printing sheet P coming out of the transferring unit 51 is guided by rollers 80 and 81 to go substantially along the tangent of the photo-sensitive drum 24, with the front edge being brought into contact with the guide member 52 of the cover 4 (as shown in part (I) of FIG. 10). As the print region increases, the printing sheet P is further moved down with its back along the guide member 52. (as shown in part (II) of FIG. 10). Thus, the printing sheet goes into the fixing unit 44 while being maintained curved. As a result, the sheet is taken into the nipping region of the heating roller 45 and the pressurizing roller 47. Rollers 45 and 47 are so positioned that the straight line connecting the central axes thereof is substantially perpendicular to the direction of movement of the printing sheet. Thus, the toner on the surface of the printing sheet P is delivered to the fixing unit 44 with its unfixed toner surface spaced by a gap ΔL from the housing body. Thus, the toner surface is not scratched by the housing body. The sheet is then subjected to fixing by the fixing unit. The printing sheet which passes through the fixing unit 44 is guided by the sheet guide member 48, so that it is discharged though the sheet discharging outlet 3 by the sheet discharging rollers 2 with its print surface side facing down.

The shield board 43 prevents the upward movement of the heat generated by the fixing unit during fixing operation. Fan 46 facilitates the removal of heat from the housing.

The toner which is not transferred onto the printing sheet from the photo-sensitive drum 24 is scraped by the blade 25 provided substantially below the photo-sensitive drum 24, thus dropping, due to its own weight, into the waste toner tank 26 which is located just below the photo-sensitive drum 24.

When the toner has been used up, the cut sheet feeder 6 is retracted to open the upper portion of the housing body 1 as shown in FIG. 5. In this operation, the frame 60 is moved horizontally, and therefore the sheets in the hoppers 63 and 64 are maintained in position.

Figure 11A:
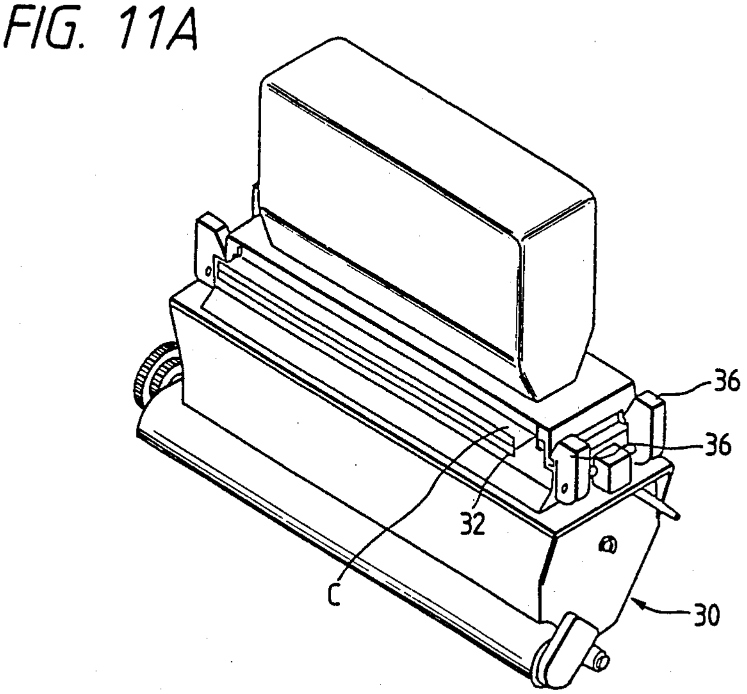
FIGS. 11A and 11B are perspective views for describing a toner supplying procedure.
Figure 11B:
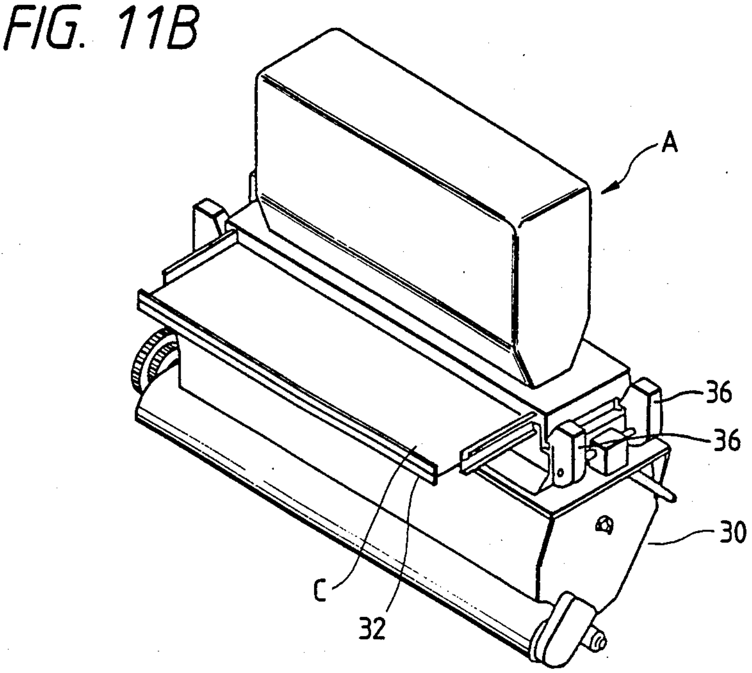

Under this condition, the engaging parts B of the cartridge A are engaged with the pawl members 36 with the shutter C on the front side as shown in the part (I) of FIG. 11. Thereafter, the cover member 32 of the developing unit 30, and the shutter C of the cartridge A are pulled forwardly to allow the toner to drop from the cartridge A into the container 31 as shown in the part (II) of FIG. 11. After the container 31 is filled with toner in this manner, the shutter C is pushed backwardly to close the cartridge A, and the cover 32 is also pushed backwardly to close the developing unit 30. Under this condition, the cartridge A is removed. Thus, the scattering of toner can be substantially prevented while supplying it to the developing unit.

The toner may leak out during a printing operation. However, scattering of the same is substantially prevented by means of the side boards 5, the partition wall 41, and the shield board 43. Such toner is accumulated in a groove 42.

If a printing sheet is caught or jammed during the printing operation, the printing sheet can be easily taken out by opening the cover 4. The sheet retaining members such as the pinch rollers 50, the transferring unit 51, and the sheet guide members 52 are disengaged from the housing body I and the sheet conveying path is exposed when the cover 4 is opened.

After the sheet has been taken out in this manner, the cover 4 is lightly pushed back to close the housing body I. When the cover 4 is opened and closed as described above, the optical writing unit 40 and the photo-sensitive drum 24 remain in the housing body 1, and, therefore, the optical writing unit 40 and the photo-sensitive drum 24 which should be positioned with high precision will never be displaced.

When maintenance or adjustment of electrical means such as the control circuit is required, the electrical means can be exposed merely by opening the side cover 8. therefore, the adjustment can be performed with the printer in operation; that is, the inspection and maintenance can be achieved with high efficiency.

Figure 12:
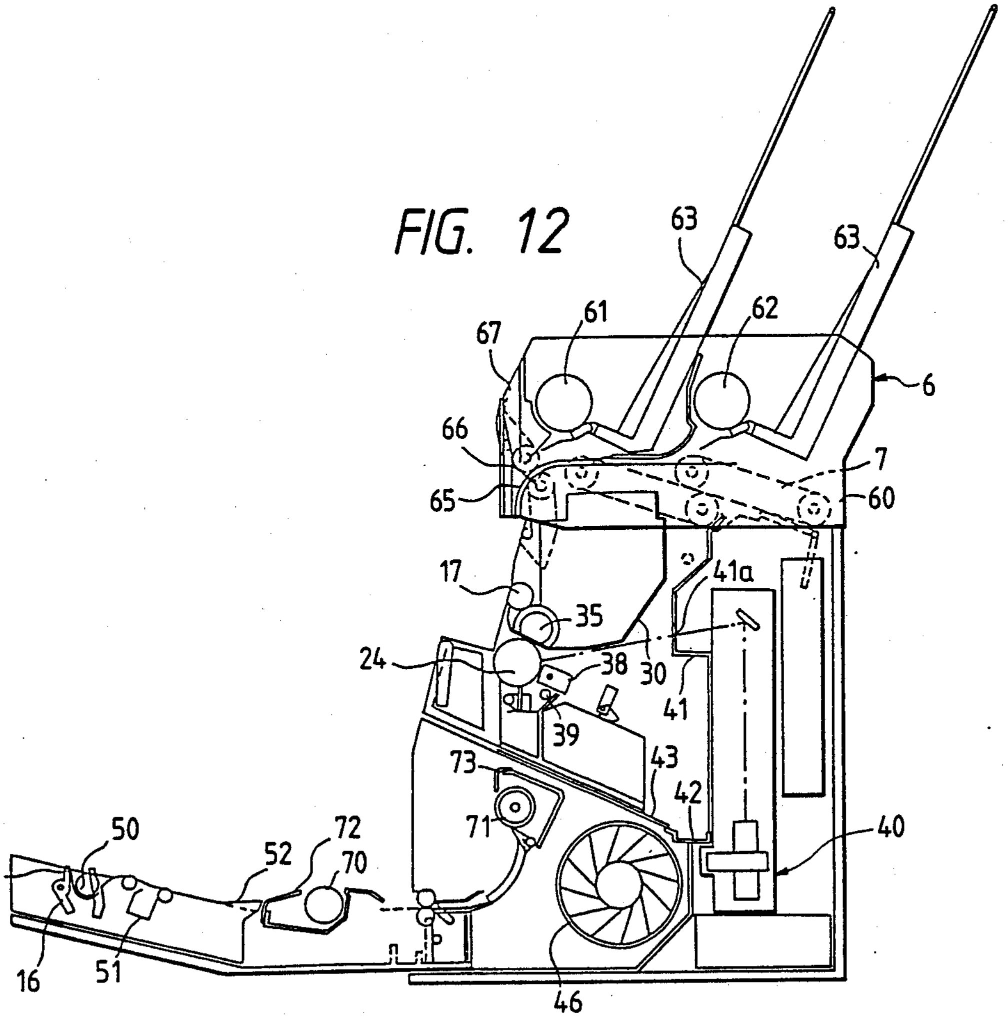
FIGS. 12 is a sectional view showing another example of the page printer according to the invention.
Figure 13:
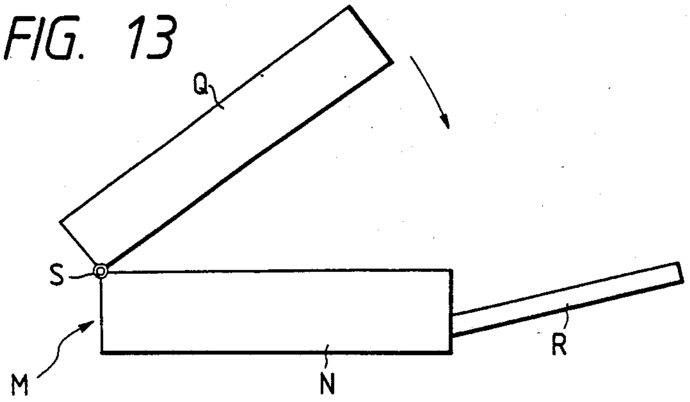
FIG. 13 is a diagram for a description of the arrangement of a conventional page printer.

FIG. 12 shows a second example of the page printer according to the invention. In FIG. 12, reference number 70 designates a pressurizing roller 70 operating in association with a heating roller 71 mounted on the housing body 1. The pressurizing roller 70 is rotatably mounted on the cover 4 in such a manner that it engages with the heating roller 71 when the cover 4 is closed. Further in FIG. 12, reference numerals 72 and 73 designates guide boards for guiding a printing sheet.

When, in the page printer shown in FIG. 12, the printing sheet is caught along the sheet conveying path, all the members guiding the printing sheet can be disengaged from the housing body to expose the sheet conveying path. Therefore, the maintenance of the page printer can be achieved with ease.

In this embodiment the page printer of the sheet conveying path is extended vertically and the fixing unit is provided in the lower end portion thereof. Therefore, the pressurizing roller 70 can be sufficiently pushed against the heating roller 71.

It may be required to use printing sheets other than those set in the hoppers. For that reason, the guide members 67 are positioned so as to accommodate the width of the printing sheets to be used, and the printing sheet is vertically inserted into the manual sheet inserting inlet 68. The sheet thus inserted goes into the sheet receiving inlet 14 to activate the sheet detecting lever 16. Thus, the printing operation is carried out as described above.

In the above-described page printer, the cut sheet feeder 6 is hinged to the housing body. However, the same effect may be obtained by providing guide grooves so that the cut sheet feeder is guided back and forth.

Furthermore in the above-described page printer, the compartment 9 is provided on the side of the housing body, to accommodate the control section. However, electrical means such as the control section may be accommodated in a casing which is mounted on the side of the housing body.

As is apparent in accordance with the invention, the units concerning the printing sheet are all positioned in the open front end of the housing body, and the members handling the printing sheet in cooperation with these units are arranged on the cover. Therefore, the printing sheet conveying path can be readily exposed by opening the cover. Further, the photo-sensitive drum and the optical writing unit which should be positioned with high precision are mounted on the housing body and thus are not shifted relative to one another.

As was described above, the compartment 9 which is large and independent of the printing mechanism is provided on the side of the housing to accommodate the electrical means such as the control unit 11. Therefore, adjustment of the printer, which requires precise and intricate adjustment, can be achieved with the printing mechanism in operation, which contributes to simplification of the assembling work or inspection and maintenance.

As was described above, in the page printer of the invention, the photo-sensitive drum unit, the fixing unit, and the sheet discharging rollers are arranged on the front side of the housing body in the order stated from above. On the other hand, the optical writing unit is provided on the rear side. Thus, the printing sheet conveying path is held substantially vertical. Further, the guide member for guiding the printing sheet is provided between the photo-sensitive drum unit and the fixing unit so the toner surface of the sheet is curved inwardly. Therefore, the printing sheet which passes through the photo-sensitive drum unit is conveyed to the fixing unit while being maintained curved with its rear side along the guide member. Thus, the toner surface, which is not yet fixed, is maintained spaced a certain distance from the mechanisms in the housing until the sheet reaches the fixing unit. Thus, the resultant print is high in quality.

Furthermore, in the printer of the invention, the straight line connecting the central axes of the pressurizing roller and the heating roller of the fixing unit is substantially perpendicular to the printing sheet as it passes the guide member. Therefore, the stiffness of the printing sheet is positively utilized to maintain the latter curved, and to allow the printing sheet to go smoothly into the fixing unit, whereby the toner surface is positively prevented from being scratched or damaged.

As was described above, in the page printer of the invention, the frame 60 is mounted over the housing body through the guide means in such a manner that it is held horizontal, and is movable between the sheet feed position and the retract position. The sheet feed rollers are mounted on the frame 60 in such a manner that they are in parallel with the front side of the housing, and the sheet hoppers are also mounted on the frame 60. The guide member is extended from below the sheet feed rollers to the sheet receiving inlet. Therefore, the installation floor area of the printer is minimized. Furthermore, since the upper portion of the printer body can be exposed by retracting the sheet fed means, maintenance of the printer is facilitated. Further, during the retraction of the sheet feeder, the sheet hoppers are maintained in position and, accordingly, the printing sheet will not be changed in position.

Moreover, in the page printer of the invention, the guide members are provided substantially above the sheet receiving inlet in such a manner that they are movable in the direction of width of the printing sheet, to form the manual sheet inserting inlet. Therefore, the printing sheet can be readily fed into the printer, and it can be inserted in parallel with the sheet printing path. Therefore, even a relatively thick printing sheet can be smoothly moved along the sheet conveying path.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. A page printer comprising:

a housing including a housing body having an open upper end, an open front side, and a cover pivotally coupled to said housing body;

a gate roller, a developing unit, a photo-sensitive drum unit, a fixing unit, and a sheet discharging roller mounted along the open front side of said housing body;

an optical writing unit mounted in a rear portion of said housing body;

a transferring unit and a sheet guide member mounted on said cover so that said transferring unit and sheet guide member are in confronting relation to said photo-sensitive drum unit when said cover is closed; and a cut sheet feeder mounted vertically above the open upper end of said housing body so as to be movable relative thereto.

2. A page printer as claimed in claim 1, wherein said photo-sensitive drum unit is detachably mounted to said housing body.

3. A page printer as claimed in claim 1, wherein said developing unit is configured so that an upper portion thereof is selectively exposed when said cut sheet feeder is moved relative to said housing body.

4. A page printer as claimed in claim 1, further comprising: guide means mounted to said cover so as to be disposed between said photo-sensitive drum unit and said fixing unit, said guide means guiding said printing sheet so that said printing sheet is convexly curved towards said cover.

5. A page printer as claimed in claim 1, wherein a straight line connecting central axes of a pressurizing roller and a heating roller which define said fixing unit is substantially perpendicular to a printing sheet passed along said guide member.

6. A page printer comprising a housing body having a front side and a rear side; a photo-sensitive drum unit, a fixing unit, and a sheet discharge roller mounted to the front side of the housing body;

an optical writing unit mounted to the rear side of said housing body, thereby to define a substantially vertical printing sheet conveying path extended; and a guide member is disposed between said photo-sensitive drum unit and said fixing unit to guide said printing sheet so that the toner surface thereof is maintained concavely curved.

7. In a page printer comprising:

a housing including a housing body with an open upper end and an open front end and a cover swingably coupled to said housing body;

a sheet receiving inlet, a gate roller, a developing unit, a photo-sensitive drum unit, and sheet discharging roller mounted to the front side of said housing body;

an optical writing unit mounted in a rear portion of said housing body;

a pinch roller, a transferring unit and a sheet guide member mounted on said cover so that said pinch roller is in facing relation to said gate roller, and said transferring unit and said sheet guide member are in facing relation to said photo-sensitive drum unit when said cover is closed; and a sheet feeding device which comprises:

a frame mounted said housing body with guide means so that said frame is horizontally movable between a sheet feed position and a retract position;

a sheet feed roller mounted in parallel with the front side of said housing;

a sheet hopper for elastically pushing the lower end portion of a printing sheet against said sheet feed roller; and a guide member extending from below said sheet feed roller to said sheet receiving inlet.

8. A sheet feeding device as claimed in claim 7, wherein guide means are provided substantially above said sheet receiving inlet so as to be movable in the direction of width of a printing sheet, thereby defining a manual sheet inserting inlet.

* * * * *